(12) United States Patent
Yang et al.

(10) Patent No.: US 8,581,100 B2
(45) Date of Patent: Nov. 12, 2013

(54) MANUFACTURING METHOD AND COVER FOR ELECTRONIC DEVICE

(75) Inventors: Nai-Lin Yang, New Taipei (TW); Bing Zhang, Shenzhen (CN); Shi-Feng Wang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 123 days.

(21) Appl. No.: 13/332,591

(22) Filed: Dec. 21, 2011

(65) Prior Publication Data

US 2013/0126203 A1    May 23, 2013

(30) Foreign Application Priority Data

Nov. 23, 2011    (CN) ...................... 2011 2 0469529 U

(51) Int. Cl.
*H02G 3/14*    (2006.01)
*H05K 5/03*    (2006.01)

(52) U.S. Cl.
USPC ............ 174/66; 174/50; 174/559; 455/575.1; 455/575.8; 264/259

(58) Field of Classification Search
USPC ............ 174/50, 66, 67, 520, 559; 455/575.1, 455/575.8; 428/67, 68, 76; 361/600, 61, 361/679.02, 679.03; 396/448; 264/259
See application file for complete search history.

(56) References Cited

U.S. PATENT DOCUMENTS

| | | | |
|---|---|---|---|
| 6,999,805 B2 * | 2/2006 | Gartrell et al. | 455/575.8 |
| 7,002,073 B2 * | 2/2006 | Lai et al. | 174/50 |
| 7,236,588 B2 * | 6/2007 | Gartrell | 455/575.1 |
| 7,436,653 B2 * | 10/2008 | Yang et al. | 455/575.1 |
| 7,950,859 B2 * | 5/2011 | Zhang et al. | 396/448 |
| 8,253,595 B2 * | 8/2012 | Yang et al. | 455/575.8 |
| 8,453,835 B2 * | 6/2013 | So | 455/575.1 |

* cited by examiner

*Primary Examiner* — Angel R Estrada
(74) *Attorney, Agent, or Firm* — Altis & Wispro Law Group, Inc.

(57) ABSTRACT

A cover for an electronic device includes a display window and a cover body injection molded with the display window. The display window includes a window body and at least one protruding portion projecting form the window body. The cover body includes a cover wall and ribs. The window body includes a front surface, a rear surface and a peripheral surface connecting the front surface and the rear surface. The at least one protruding portion is fixed on the peripheral surface and embedded between the cover wall and the ribs.

17 Claims, 7 Drawing Sheets

MANUFACTURING METHOD AND COVER FOR ELECTRONIC DEVICE

BACKGROUND

1. Technical Field

The disclosure generally relates to covers for electronic devices and methods for manufacturing the covers.

2. Description of the Related Art

Electronic devices (e.g. mobile phones) may include a front cover and a display window. The front cover and the display window are respectively molded by injection molding, and are latched as a whole by typical latches. However, the mounting assembly is time-consuming, the mounted latch may be unlatched under a large external force.

Therefore, there is room for improvement within the art.

BRIEF DESCRIPTION OF THE DRAWINGS

Many aspects of the exemplary cover for electronic device and method for manufacturing same can be better understood with reference to the following drawings. The components in the various drawings are not necessarily drawn to scale, the emphasis instead being placed upon clearly illustrating the principles of the exemplary cover for electronic device. Moreover, in the drawings, like reference numerals designate corresponding parts throughout the diagrams.

DETAILED DESCRIPTION

Figure 3:
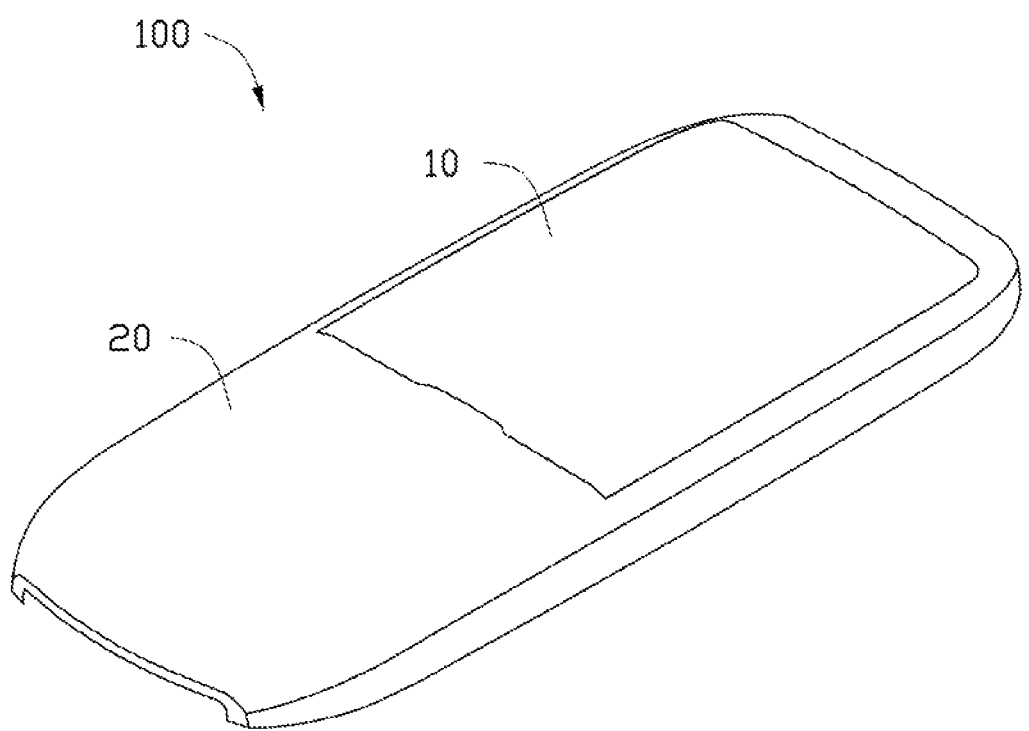
FIGS. 3 and 4 are isometric views of a cover for an electronic device according to an exemplary embodiment.
Figure 4:
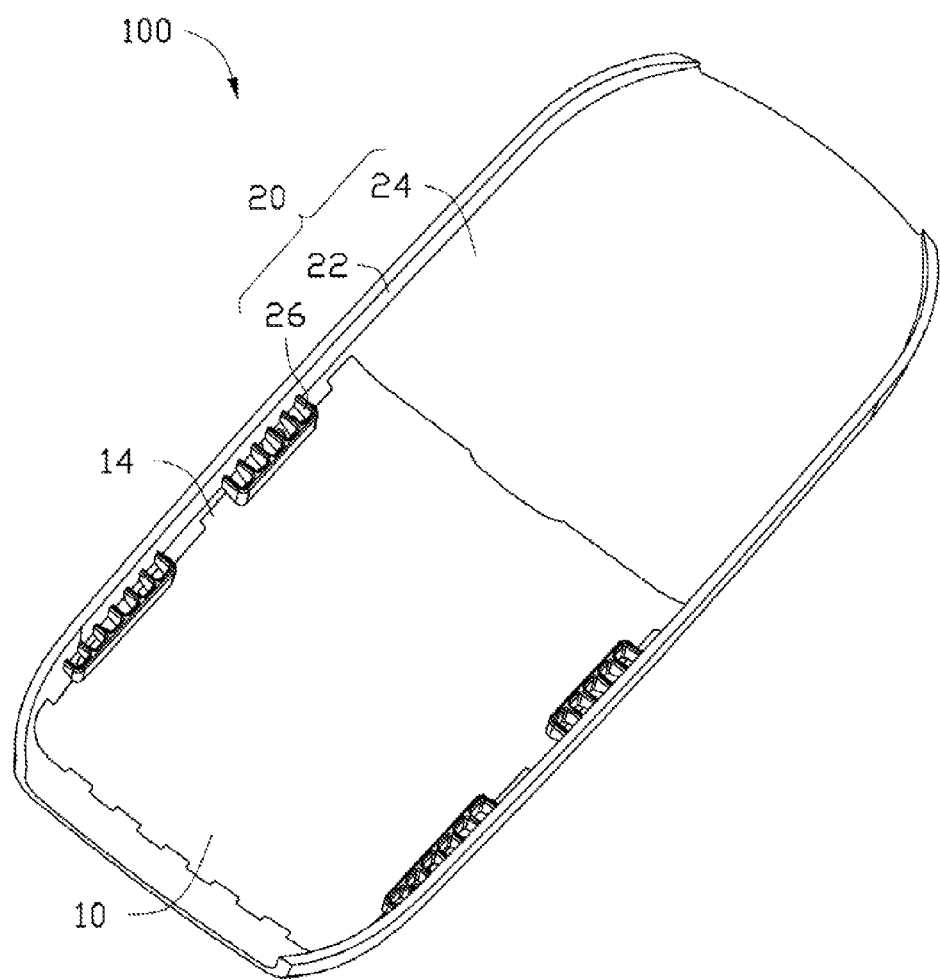
Figure 5:
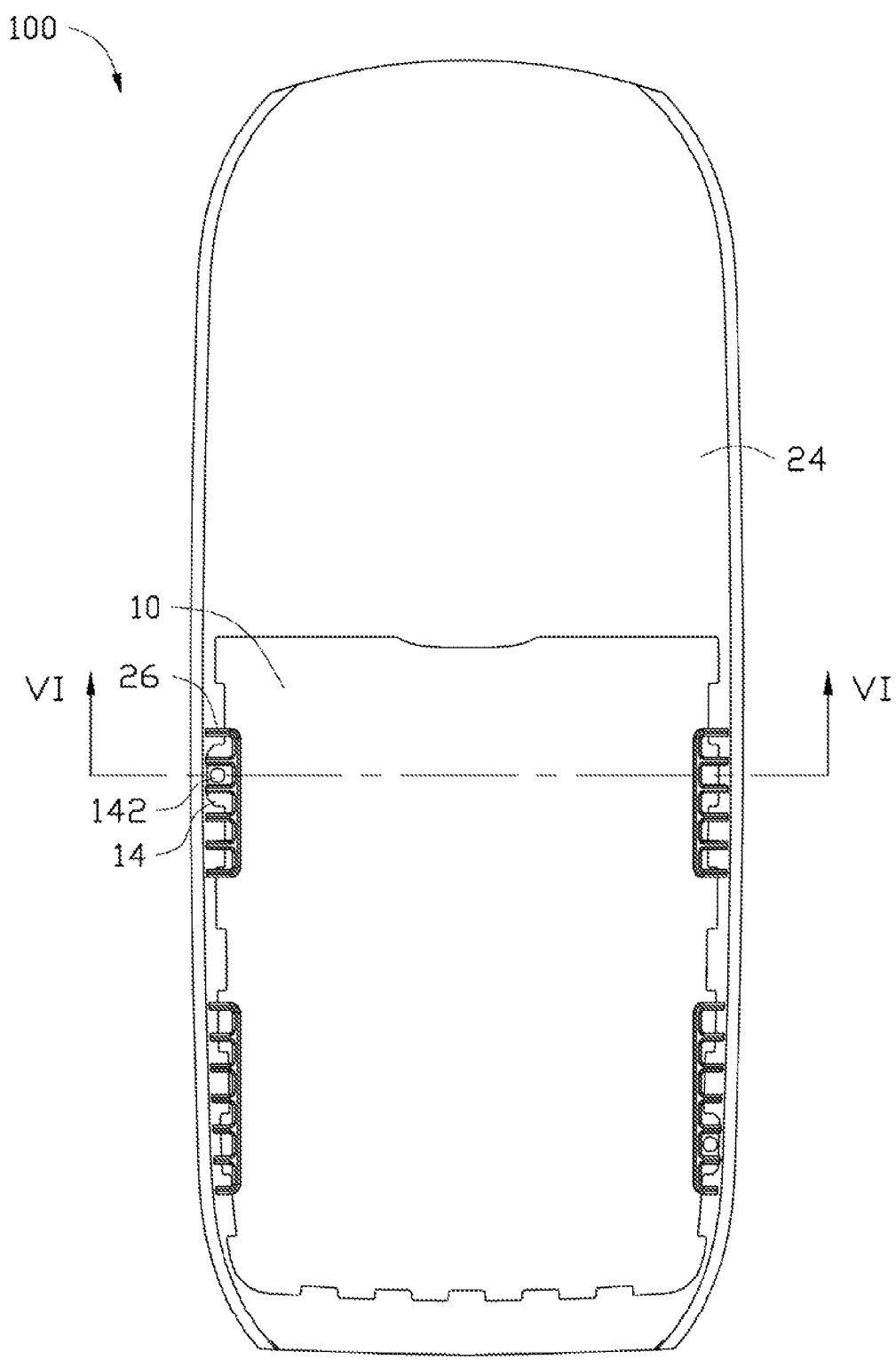
FIG. 5 is a rear elevational view of the cover shown in FIG. 3.
Figure 6:
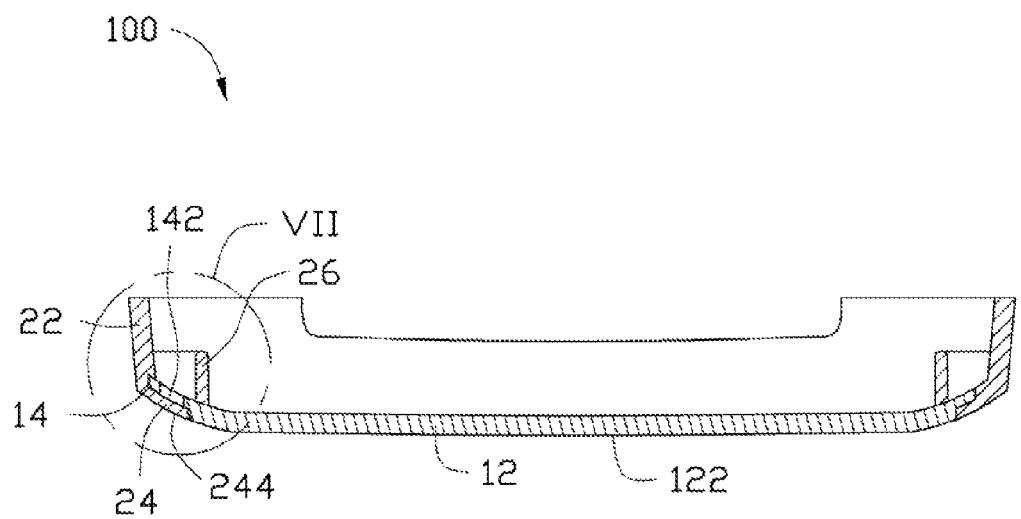
FIG. 6 is a cross-sectional view of the cover in FIG. 5, taken along line VI-VI.

FIG. 3 shows an exemplary embodiment of a cover 100 including a display window 10 and a cover body 20 injection molded with the display window 10.

Figure 1:
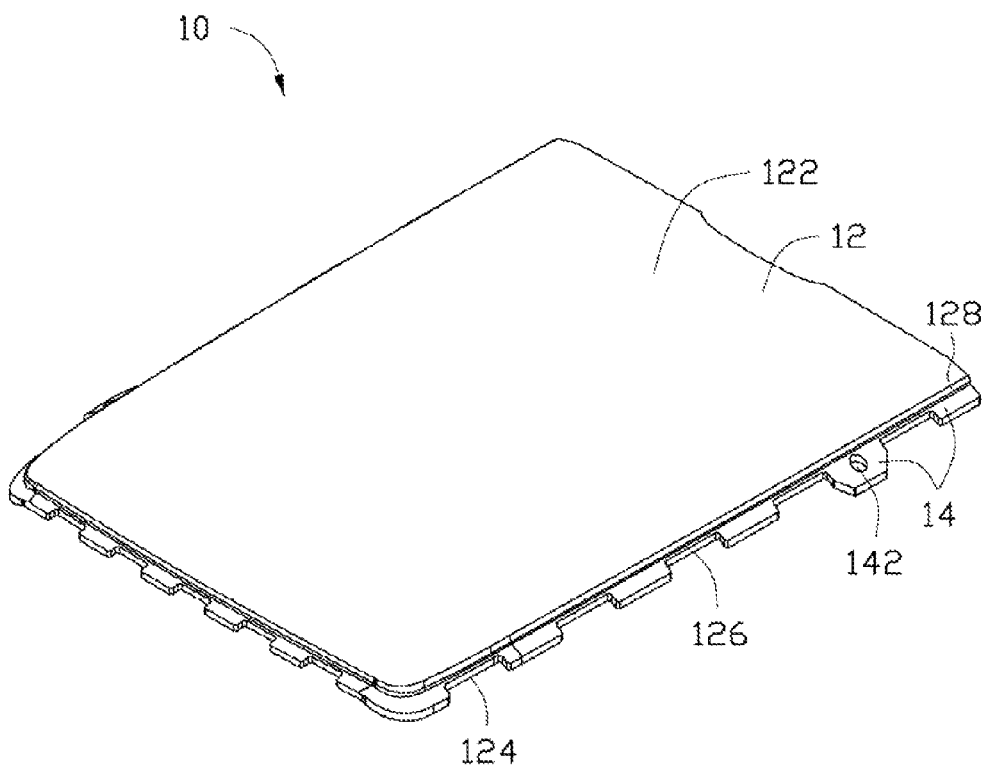
FIGS. 1 and 2 are isometric views of a display window of a cover for an electronic device according to an exemplary embodiment.
Figure 2:
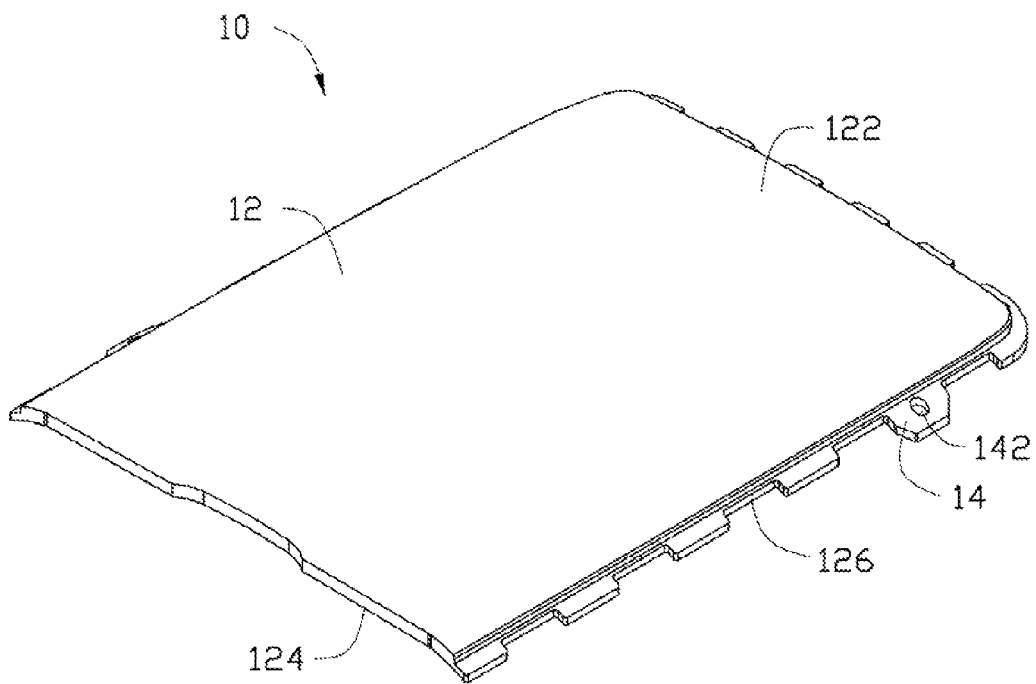
Figure 7:
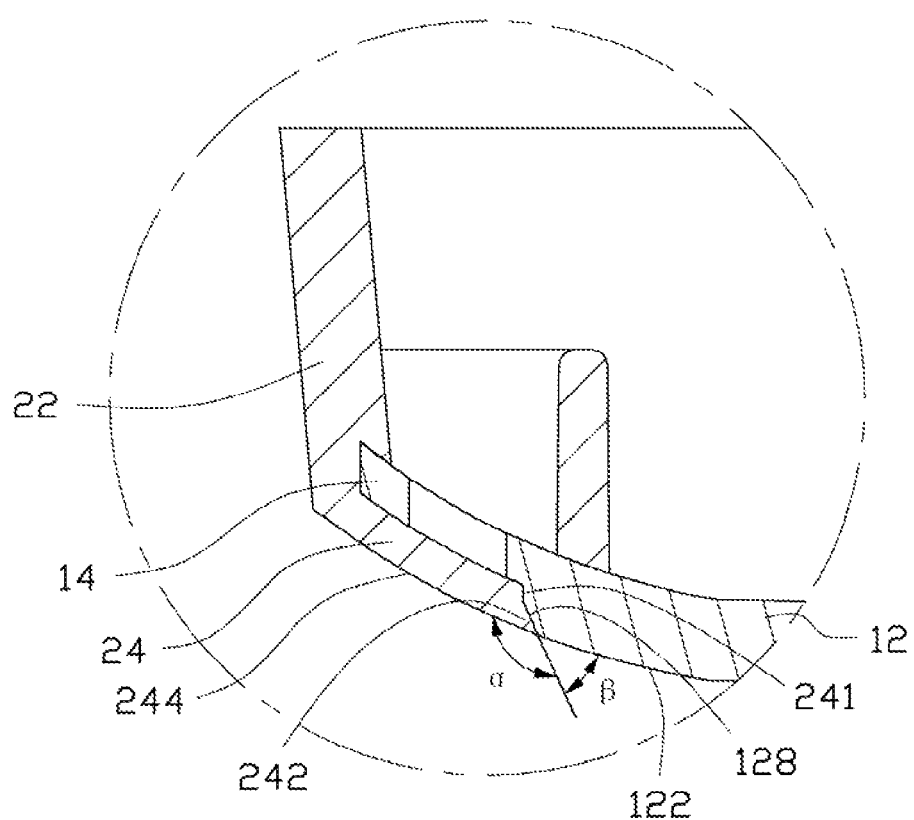
FIG. 7 is a partially enlarged view of the area VII shown in FIG. 6.

In FIGS. 1-2 and 7, the display window 10 includes a window body 12 and protruding portions 14 projecting from the window body 12. The window body 12 includes a front surface 122, a rear surface 124 opposite to the front surface 122, a peripheral surface 126 connecting the rear surface 124, and a wedge surface 128 connecting the front surface 122 and the peripheral surface 126. The front surface 122 and the wedge surface 128 define a first angle labeled "α" shown in FIG. 7. The first angle α is in a range from about 90 degrees to about 180 degrees for preventing the molten thermosetting plastic from leaking and molding onto the front surface 122 during molding of the cover body 20. The protruding portions 14 are fixed on the peripheral surface 124. Some of the protruding portions 14 define fixing holes 142. The fixing holes 142 fix the display window 10 to an injection molding machine for molding.

FIGS. 4-7, the cover body 20 includes two opposite side walls 22, a main wall 24 connecting the side walls 22, and ribs 26 projecting from the side walls 22. The ribs 26 resist against the display window 10. Some of the protruding portions 14 are secured between the main wall 24 and the ribs 26, securing the display window 10 and the cover body 20 in a fixed position. The main wall 24 has a portion covering the wedge surface 128 and defines a flange 242. The end of the flange 242 and the front surface 122 define a second angle labeled "β" shown in FIG. 7. The second angle β is a supplementary angle of the first angle α. The end of the flange 242 completely mates with and resists against the wedge surface 128. The resistance of the flange 242 against the wedge surface 128 further prevents the display window 10 and cover body 20 from detaching relative to each other. The main wall 24 defines a main surface 244. The main surface 244 and the front surface 122 cooperatively form a seamless surface of the cover 100.

A method for making the cover 100 may include providing an injection molding machine. The injection molding machine includes a molding chamber. The display window 10 is positioned in the second molding chamber. Molten thermosetting plastic is injected into the molding chamber to mold the cover body 20 on the display window 10. The thermosetting plastic is one or more materials selected from a group consisting of polyethylene, polyvinyl alcohol, polypropylene, polycarbonate, polymethyl methacrylate, acrylonitrile butadiene styrene, and polystyrene.

It is to be understood, however, that even though numerous characteristics and advantages of the exemplary disclosure have been set forth in the foregoing description, together with details of the system and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A cover for an electronic device, comprising:
    a display window comprising a window body and at least one protruding portion projecting form the window body, the window body comprising a front surface, a rear surface and a peripheral surface connecting the front surface and the rear surface, the at least one protruding portion extending from the peripheral surface; and
    a cover body secured in a fixed position on the display window, the cover body comprising a main wall and ribs projecting from the main wall, the at least one protruding portion secured between the main wall and the ribs, and the ribs resisting against the display window.

2. The cover as claimed in claim 1, wherein the window body further comprises a wedge surface connecting the front surface and the peripheral surface, and the front surface and the wedge surface define a first angle.

3. The cover as claimed in claim 2, wherein the first angle is ranged from 90 degrees to 180 degrees.

4. The cover as claimed in claim 2, wherein the cover wall covered on the wedge surface defines a flange, the end of the flange and the front surface define a second angle which is a supplementary angle of the first angle.

5. The cover as claimed in claim 1, wherein the cover body comprises two opposite side walls and the main wall connecting the side walls, the display window is embedded in the main wall.

6. The cover as claimed in claim 5, wherein the main wall defines a main surface, the main surface and the front surface cooperatively form a seamless surface of the cover.

7. The cover as claimed in claim 1, wherein the cover body is molded from thermosetting plastic.

8. The cover as claimed in claim 7, wherein the thermosetting plastic is one or more selected from a group of polyethylene, polyvinyl alcohol, polypropylene, polycarbonate, polymethyl methacrylate, acrylonitrile butadiene styrene, and polystyrene.

9. A method of making a cover for an electronic device, comprising:

provided a display window comprising a window body and at least one protruding portion projecting form the window body, the window body comprising a front surface, a rear surface and a peripheral surface connecting the front surface and the rear surface; and injecting molted thermosetting plastic onto the peripheral surface to form a cover body, the cover body comprising a cover wall and ribs, the at least one protruding portion is fixed on the peripheral surface and embedded between the cover wall and the ribs;

wherein the window body further comprises a wedge surface connecting the front surface and the peripheral surface, and the front surface and the wedge surface define a first angle.

10. The method of making a cover as claimed in claim 9, wherein the first angle is ranged from 90 degrees to 180 degrees.

11. The method of making a cover as claimed in claim 9, wherein the cover wall covered on the wedge surface defines a flange, the end of the flange and the front surface defines a second angle which is a supplementary angle of the first angle.

12. The method of making a cover as claimed in claim 9, wherein the cover wall comprises two opposite side walls and a main wall connecting the side walls, the display window is embedded in the main wall.

13. The method of making a cover as claimed in claim 12, wherein the main wall defines a main surface, the main surface and the front surface cooperatively form a seamless surface of the cover.

14. The method of making a cover as claimed in claim 9, wherein the thermosetting plastic is one or more selected from a group of polyethylene, polyvinyl alcohol, polypropylene, polycarbonate, polymethyl methacrylate, acrylonitrile butadiene styrene, and polystyrene.

15. A cover for an electronic device, comprising:

a display window comprising a window body and at least one protruding portion projecting form the window body, the window body comprising a front surface, a rear surface and a peripheral surface connecting the front surface and the rear surface; and a cover body injection molded with the display window, the cover body comprising a cover wall and ribs, the at least one protruding portion is fixed on the peripheral surface and secured between the cover wall and the ribs;

wherein the window body further comprises a wedge surface connecting the front surface and the peripheral surface, and the front surface and the wedge surface define a first angle.

16. The cover as claimed in claim 15, wherein the first angle is ranged from 90 degrees to 180 degrees.

17. The cover as claimed in claim 15, wherein the cover wall covered on the wedge surface defines a flange, the end of the flange and the front surface define a second angle which is a supplementary angle of the first angle.

* * * * *